United States Patent

[11] 3,589,468

[72] Inventor  Harry H. Rowand Jr.
               Oakmont, Pa.
[21] Appl. No. 25,328
[22] Filed     Apr. 3, 1970
[45] Patented  June 29, 1971
[73] Assignee  Aluminum Company of America
               Pittsburgh, Pa.

[54] NOISE SUPPRESSION IN CUTTING OPERATIONS
     8 Claims, 3 Drawing Figs.
[52] U.S. Cl. .................................................. 181/33,
                                    77/55, 83/169, 143/158
[51] Int. Cl. ..................................................... B26d 7/08,
                                                                  B27b 5/38

[50] Field of Search............................................ 181/33, 35,
                                   33.02, 33.4; 77/55.3, 55; 83/169; 143/158

[56]                 References Cited
              UNITED STATES PATENTS
1,280,341  10/1918  Wardman.....................  143/158 UX
1,348,828   8/1920  Fessenden....................  181/33.02
1,698,117   1/1929  Ashley..........................  143/158 UX
                 FOREIGN PATENTS
  780,560   8/1957  Great Britain................        83/169

Primary Examiner—Robert S. Ward, Jr.
Attorney—Abram W. Hatcher

ABSTRACT: Reducing noise level and removing mist, smoke, fumes and chips encountered in cutting metal, wood, plastics, glass, ceramics and the like by blanketing the area with foam.

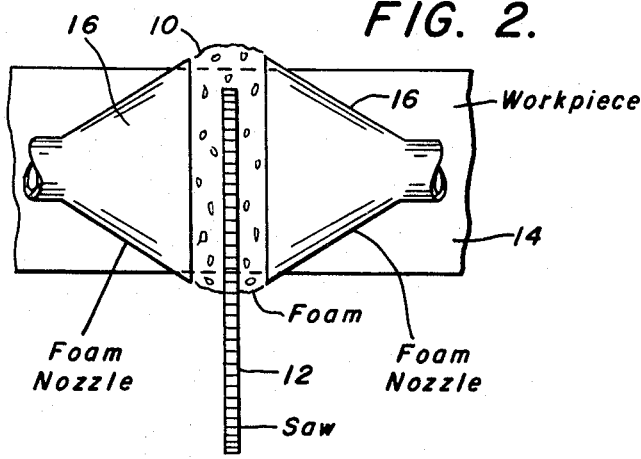
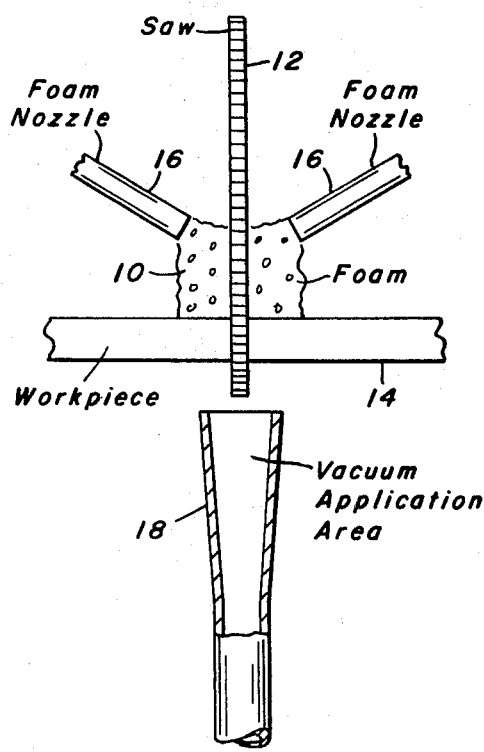
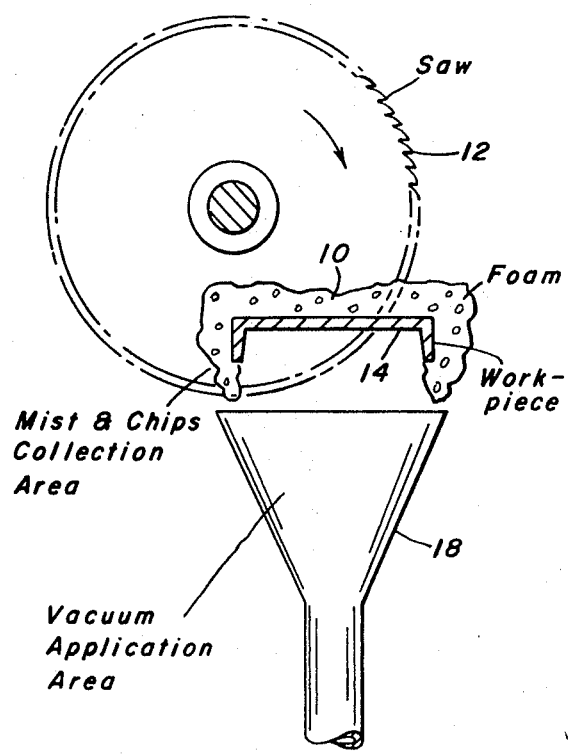

NOISE SUPPRESSION IN CUTTING OPERATIONS

SUMMARY OF THE INVENTION

After considerable investigation I have found that the aforementioned problems of noise level and undesirable, or even unsafe, levels of mist and chips in the cutting area may be considerably alleviated by providing a blanket of foam to generally surround the workpiece in the vicinity of the cutting, for example, sawing or machining, operation. By foam I mean gas, for example, air, droplets inside a liquid, preferably cleaning or lubricating, continuum. When a foam is employed to blanket the area, chips created by the cutting operation are entrapped in the foam, which also forms a sort of sound barrier, thereby having a muffling effect upon the noise and reducing the noise level substantially to a nondangerous level. The blanket of foam also entraps lubricant which otherwise might stay on the workpieces and cause chips to adhere thereto. The machined parts or products therefore become substantially dry and substantially free of tenacious chips.

According to my invention, to be useful the foam should be of sufficient density and stability to stay in the general area surrounding the cutting operation, such as sawing aluminum extrusions, until intentionally removed, for example, by drawing away through means of a vacuum. That is, it should have a density and stability sufficient to keep it from floating away from the area, being easily blown away by air currents, or breaking down rapidly shortly after application, before at least a few minutes, for example, five, have passed. One way in which the stability of the foam useful according to the invention may be described is in terms of preferred maximum volume lost per unit of time when the foam is applied to the cutting area. My preferred maximum loss of volume is 20 percent in a 10-minute period. Another way of specifying the noise-suppressing capability of the foam used according to the invention is in terms of its preferred expansion ratio, that is, the volume of foam used divided by the volume of liquid required to produce the foam. The preferred expansion ratio is from 30:1 to 300:1.

The chips, mist, smoke, fumes and the like in the foam which result from the cutting operation and are caught by the foam may be entrapped in a cloth or other-type filter. A blanket of foam from one-inch thick upward is generally sufficient according to my invention.

The invention may be practiced by blanketing the cutting area with a foam generated from a commercially available foamable liquid such as Concrete Foamer E, Concrete Foamer N, and AER-O-FOAM 3 percent Regular, all supplied by National Foam System, Inc. and Lustre Foam, a product of Wayne Chemical Company, or from a natural solvent such as an oil. The foam may also be a commercially available aerosol. In general, it may be formed by admixing with a cleaning or lubricating or like liquid a liquid or solid foaming agent, and in some instances a liquid or solid foam stabilizer, and suitably foaming, for example, by heating the resulting mixture or by suitably aerating, such as by air aspiration or compressed air foaming, with resultant formation of the required gas-in-liquid suspension. Another way of forming the foam is by use of impeller blades.

According to my invention, a blanket of foam at least 1-inch thick is sufficient to bring about the desired noise-muffling and chip-removing results. The foam may be withdrawn from the cutting area, for example, by applying a vacuum, and conveyed to a temperature-conditioning unit in which it is collapsed to a liquid, with the resulting liquid being passed through a trap or filter means whereby solids suspended in the liquid are removed prior to refoaming of the purified liquid and reuse as foam, if desired.

The lubricating or cleaning or like liquid useful in the foam according to my invention may be either an organic or aqueous liquid, solution or emulsion. For example, it may include mineral acids such as nitric, hydrochloric, sulfuric or phosphoric or certain organic acids such as citric, tartaric, oxalic, sulfonic or the like; alkaline materials such as NaOH, $Na_2CO_3$; $NaHCO_3$; phosphates such as those of the nature of polyphosphates and softener or like material identified by the trademark "calgon"; sequestering and chelating agents such as ethylene-diaminetetracetic acids and certain salts thereof. The liquid which may be used to form the foam useful according to my invention may also be an organic solvent, a detergent, a salt solution or a water solution; a mixture, an emulsion or a slurry. While a room-temperature or normal operating temperature may be used, and the temperature during use of the foam to stifle the noise and remove chips from the cutting area according to my invention is not critical, an elevated temperature may also be used, for example, a temperature of about 125° F. to 225° F., especially when a foam stabilizer such as perfluoro-$(C_8F_{17})$ alkanesulfonamide is used or when heat is used in foaming the liquid. The time during which the foam is maintained in the area of sawing or other cutting operation ranges from a few minutes to about 48 hours.

When a foaming agent is used in producing the foam, it may consist, for example, of a freon, such as $CClF_2CClF_2$, $CHClF_2$ and mixtures thereof or the like, fluorocarbon and other hydrocarbons. Other foaming agents useful in forming a foam from liquid suitable according to my invention include chloroform, carbon tetrachloride, cyclohexane, n-pentane and the like.

A stabilizer may be used to decrease the surface tension sufficiently during foaming to improve the desired stability of the foam, for example, the stabilizer of U.S. Pat. No. 2,759,019, the quaternary methyl halide of a perfluoro-alkanesulfonamide. Other suitable foam stabilizing agents are sodium-N-coconut acid-N-methyl-laurate, which is of the anionic type surfactant, di-coconut-di-methyl ammonium chloride, which is of the cationic type surfactant, ethylene oxide-nonylphenol adducts, and 2 - coconut - 1 - hydroxy-1-sodium ethoxy-1-sodium acetoxy imidazoline-2.

DESCRIPTION OF THE DRAWING AND OF THE PREFERRED EMBODIMENT

For a better understanding of my invention reference will now be made to the drawing, in which FIGS. 1, 2, and 3 are respectively front, top and side views of a representative embodiment of the foam blanketing procedure and apparatus of the invention.

In the drawing, a blanket of foam 10 is created in the vicinity of the work area in which saw 12 is acting on workpiece 14. The foam may be supplied from nozzles 16. Vacuum may be applied at 18 to draw away used foam containing chips and fumes which have been entrapped in the foam.

By use of a device such as depicted in sawing aluminum extrusions employing AER-O-FOAM 3 percent Regular as the foam producer, noise level was reduced from above 90 db. to as low as 70 db. A mist collector collected only 0.0442 g. mist after the area was blanketed with foam according to my invention as compared to 0.1748 g. for the same period before using the foam, indicating that most of the mist generated by such a sawing operation is removed by employing the invention. Also, the sawed extrusion products which resulted when the sawing area was blanketed with foam according to the invention were substantially dry and substantially free of tenacious chips.

While the invention has been described in terms of preferred embodiments, the claims appended hereto are intended to encompass all embodiments which fall within the spirit of the invention.

Having thus described my invention and certain embodiments thereof, I claim:

1. A process for reducing noise, mist and chip problems in cutting wood, metal, plastics, glass, ceramics and the like which comprises blanketing a cutting area with foam, thereby muffling the cutting noise and entrapping mist and chips created by said cutting.

2. The process of claim 1 wherein the foam with which the cutting area is blanketed is sufficiently stable to remain in the area for at least about five minutes.

3. The process of claim 1 wherein the foam with which the cutting area is blanketed is sufficiently stable that the maximum volume of foam lost is 20 percent in a 10-minute time period.

4. The process of claim 1 wherein the foam with which the cutting area is blanketed has an expansion ratio of from 30:1 to 300:1.

5. The process of claim 1 wherein the foam is produced from a lubricating or cleaning liquid.

6. The process of claim 1 wherein the foam blanketing the cutting area is at least about 1-inch thick.

7. The process of claim 1 wherein the foam is removed from the area and filtered.

8. The process of claim 7 wherein the foam is removed from the area by drawing with a vacuum.

UNITED STATES PATENT OFFICE
CERTIFICATE OF CORRECTION

Patent No. 3,589,468               Dated June 29, 1971

Inventor(s)   Harry H. Rowand, Jr.

It is certified that error appears in the above-identified patent and that said Letters Patent are hereby corrected as shown below:

Col. 1, line 4     After the title, insert the following:

--BACKGROUND OF THE INVENTION

This invention relates to cutting operations. More particularly, it relates to cutting metals, wood, plastics, glass, ceramics and the like, for example, by sawing.
The cutting of metals and plastics and other types of workpieces, for example, by sawing or machining, to a certain extent tends to create health and other hazards. For example, the noise level often approaches a threshold above which impeding of the hearing of persons working in the area may sometimes tend to result. Also, the amount of oil mist and chips in the vicinity of the cutting operation may reach a dangerous level. Furthermore, problems are often caused by chips adhering to extrusions or like surfaces of the workpieces, and the quality of the workpieces may be lowered by the creation of so-called "burrs" on the cut surfaces, that is, occasional defects or undesirably rough, uneven or non-uniform portions.--

Signed and sealed this 21st day of December 1971.

(SEAL)
Attest:

EDWARD M. FLETCHER, JR.          ROBERT GOTTSCHALK
Attesting Officer                Acting Commissioner of Patents